US009091559B2

(12) United States Patent
Hancock

(10) Patent No.: US 9,091,559 B2
(45) Date of Patent: Jul. 28, 2015

(54) MANAGING ELECTRICAL POWER UTILIZATION IN AN ELECTRIC VEHICLE

(75) Inventor: Steven M. Hancock, Delray Beach, FL (US)

(73) Assignee: International Business Machines Corporation, Armonk, NY (US)

(*) Notice: Subject to any disclaimer, the term of this patent is extended or adjusted under 35 U.S.C. 154(b) by 677 days.

(21) Appl. No.: 12/817,250

(22) Filed: Jun. 17, 2010

(65) Prior Publication Data

US 2011/0313652 A1    Dec. 22, 2011

(51) Int. Cl.
*G01C 21/12* (2006.01)
*G01C 21/34* (2006.01)
*B60L 3/12* (2006.01)

(52) U.S. Cl.
CPC ............. *G01C 21/343* (2013.01); *B60L 3/12* (2013.01); *G01C 21/3469* (2013.01); *B60L 2240/622* (2013.01); *B60L 2240/642* (2013.01); *B60L 2240/645* (2013.01); *B60L 2240/647* (2013.01); *B60L 2240/68* (2013.01); *B60L 2240/72* (2013.01); *B60L 2250/10* (2013.01); *B60L 2250/12* (2013.01); *B60L 2250/16* (2013.01); *B60L 2250/30* (2013.01); *B60L 2260/44* (2013.01); *B60L 2260/52* (2013.01); *B60L 2260/54* (2013.01); *Y02T 10/7291* (2013.01); *Y02T 90/16* (2013.01); *Y02T 90/161* (2013.01); *Y02T 90/162* (2013.01); *Y02T 90/163* (2013.01)

(58) Field of Classification Search
CPC ................ G01C 21/3484; G08G 1/096838
USPC .......................................... 701/201, 424, 411
See application file for complete search history.

(56) References Cited

U.S. PATENT DOCUMENTS

| | | | |
|---|---|---|---|
| 5,790,976 A * | 8/1998 | Boll et al. ................... | 455/456.5 |
| 5,815,824 A | 9/1998 | Moroto et al. | |
| 5,892,346 A | 4/1999 | Saga et al. | |
| 7,013,205 B1 | 3/2006 | Hafner et al. | |
| 7,374,003 B1 | 5/2008 | Fernandez | |
| 2005/0187677 A1* | 8/2005 | Walker ............................ | 701/16 |
| 2006/0224797 A1* | 10/2006 | Parish et al. ..................... | 710/62 |
| 2007/0208492 A1* | 9/2007 | Downs et al. .................. | 701/117 |
| 2007/0208497 A1* | 9/2007 | Downs et al. .................. | 701/117 |
| 2007/0225901 A1* | 9/2007 | Yamaguchi ................... | 701/201 |
| 2007/0282495 A1* | 12/2007 | Kempton et al. ............... | 701/22 |
| 2008/0262667 A1 | 10/2008 | Otabe | |

(Continued)

OTHER PUBLICATIONS

Kessels, J.T.B.A., et al. "Electronic Horizon: Energy Management Using Telematics Information" Vehicle Power and Proplulsion Conference (2007), IEEE (Sep. 9-12, 2007), pp. 581-586.

(Continued)

*Primary Examiner* — Behrang Badii
*Assistant Examiner* — Daniel L Greene
(74) *Attorney, Agent, or Firm* — Patterson & Sheridan, LLP

(57) ABSTRACT

Managing energy capacity in an electric vehicle based on a driver profile. This is achieved by various means, including interactively determining a travel plan with a user, calculating a total travel distance for the travel plan, determining how far the electric vehicle can travel based on its current energy level, and creating an energy replenishment plan based on the travel plan, the total travel distance, how far the vehicle can currently travel, and the driver profile.

21 Claims, 6 Drawing Sheets

(56) References Cited

U.S. PATENT DOCUMENTS

| | | |
|---|---|---|
| 2008/0262668 A1 | 10/2008 | Yamada |
| 2008/0312782 A1 | 12/2008 | Berdichevsky et al. |
| 2009/0021213 A1* | 1/2009 | Johnson .................. 320/109 |
| 2009/0114463 A1* | 5/2009 | DeVault ................ 180/65.29 |
| 2009/0138099 A1* | 5/2009 | Veillette .................... 700/22 |
| 2009/0198398 A1 | 8/2009 | Yamada |
| 2009/0229900 A1 | 9/2009 | Hafner et al. |
| 2011/0224852 A1* | 9/2011 | Profitt-Brown et al. ........ 701/22 |
| 2011/0288765 A1* | 11/2011 | Conway .................... 701/201 |

OTHER PUBLICATIONS

Barth, Mathew, et al. "Environmentally-Friendly Navigation" Intelligent Transportation Systems Conference Sep. 30-Oct. 3, 2007, Proceedings of the 2007 IEEE, pp. 684-689.

Gonder, Jeffrey, et al. "Energy Management Strategies for Plug-In Hybrid Electric Vehicles" National Renewable Energy Laboratory, Presented at the 2007 SAE World Congress, Apr. 16-19, 2007, pp. 1-5.

* cited by examiner

MANAGING ELECTRICAL POWER UTILIZATION IN AN ELECTRIC VEHICLE

BACKGROUND

1. Field

Embodiments of the invention are generally related to vehicle navigation systems. And more specifically, embodiments are related to techniques for creating an energy utilization plan based on a user's travel plan.

2. Description of the Related Art

As global oil resources are limited, the current petroleum-based transportation system cannot continue indefinitely, and thus the need for alternative fuels and energy sources is apparent. Currently, a number of petroleum-alternatives exist. One such alternative is electric vehicles, which are capable of operating on battery power alone and with no fuel whatsoever.

However, while petroleum-based vehicles can be refueled relatively quickly, electric vehicles may take a substantial amount of time to recharge their batteries. While it may take a matter of minutes for a driver to refuel a petroleum-based vehicle, it may take several hours to fully recharge an electric vehicle. Additionally, the infrastructure for recharging electric vehicles is still developing and thus electric recharging stations are not as common as, for example, petroleum refueling stations. Thus, it can be difficult for a driver of an electric vehicle to even find a recharging station, and then once he finds one, the driver must still wait a substantial amount of time for the vehicle to recharge.

A further limitation of electric vehicles is that their range is currently limited compared to petroleum-based vehicles. Thus, if a driver wishes to drive an electric vehicle over an extended distance, the driver will have to recharge the vehicle more frequently. Because of this range limitation, drivers may feel range anxiety when driving electric vehicles. That is, drivers of electric vehicles may be uncertain that the capacity of their battery is sufficient for their planned (or unplanned) usage of the vehicle. For example, a driver may wish to stop at a grocery store on his way home from work, but may be uncertain whether his electric vehicle can travel the extra distance without recharging. Furthermore, factors such as traffic and road closings may influence the driver's travel time and make the driver more uncertain as to whether his electric vehicle can complete the trip.

To combat this range limitation, drivers may opt to drive a hybrid electric vehicle. A hybrid electric vehicle, as defined herein, is a vehicle capable of operating exclusively on electric power for shorter distances, and may use a fuel-based mechanism for travelling longer distances. Alternatively, drivers of electric vehicles may use a range extender module. The range extender is a pluggable component that allows the electric vehicle to run on fuel (e.g., petroleum) for a limited amount of time. In other words, the range extender module effectively converts a fully electric vehicle into a hybrid electric vehicle. However, even with a hybrid electric vehicle, it can be difficult for the user to optimally manage his battery recharging, given the limitations discussed above. For instance, if a user is very poor at managing his battery power level, the hybrid electric vehicle will operate almost entirely on liquid fuel, and thus gain none of the advantages of an electric vehicle. Thus, even with a hybrid electric vehicle, drivers may be insecure and inefficient with regard to maintaining the energy level in their vehicle.

SUMMARY

The present disclosure generally provides techniques for managing the energy capacity of a vehicle.

One embodiment of the invention provides a computer-implemented method for managing the energy capacity of a vehicle, including: generating, interactively with the user, a current travel plan, wherein the current travel plan includes one or more waypoints, and wherein the current travel plan is generated with reference to historical data relating to previous trips made by the user; calculating a travel distance based on the current travel plan, wherein the travel distance is the total distance to travel, in the specified order, to each of the one or more waypoints in the current travel plan; determining a maximum distance the vehicle can travel based on a current energy level of the vehicle; and if the travel distance is greater than the maximum distance, creating an energy replenishment plan including one or more refueling waypoints, based on the current travel plan and a user profile that includes one or more preferences of the user for particular refueling waypoints.

Another embodiment of the invention provides a computer-readable storage medium containing a program which, when executed, performs an operation. The operation includes: generating, interactively with the user, a current travel plan, wherein the current travel plan includes one or more waypoints, and wherein the current travel plan is generated with reference to historical data relating to previous trips made by the user. The operation further includes calculating a travel distance based on the current travel plan, wherein the travel distance is the total distance to travel, in the specified order, to each of the one or more waypoints in the current travel plan. Additionally, the operation includes determining a maximum distance the vehicle can travel based on a current energy level of the vehicle; and if the travel distance is greater than the maximum distance, creating an energy replenishment plan including one or more refueling waypoints, based on the current travel plan and a user profile that includes one or more preferences of the user for particular refueling waypoints.

Yet another embodiment of the invention provides a system, including: a computer processor; and a memory containing a program that, when executed on the computer processor, is configured to perform an operation for managing energy capacity in a vehicle. The operation includes: generating, interactively with the user, a current travel plan, wherein the current travel plan includes one or more waypoints, and wherein the current travel plan is generated with reference to historical data relating to previous trips made by the user. The operation further includes calculating a travel distance based on the current travel plan, wherein the travel distance is the total distance to travel, in the specified order, to each of the one or more waypoints in the current travel plan. Additionally, the operation includes determining a maximum distance the vehicle can travel based on a current energy level of the vehicle; and if the travel distance is greater than the maximum distance, creating an energy replenishment plan including one or more refueling waypoints, based on the current travel plan and a user profile that includes one or more preferences of the user for particular refueling waypoints.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are

DETAILED DESCRIPTION OF THE PREFERRED EMBODIMENTS

Figure 1:
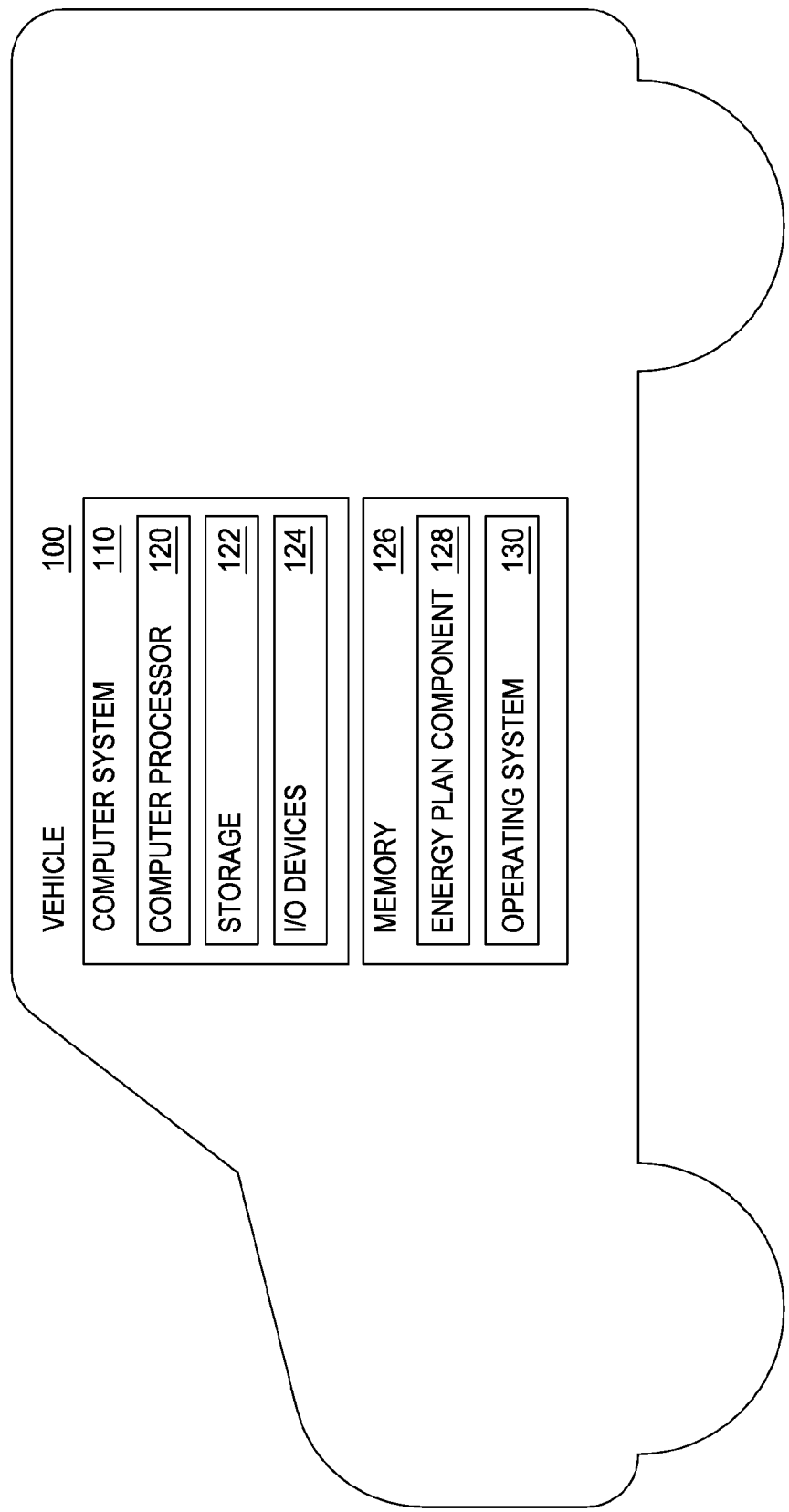
FIG. 1 is a block diagram of components of a computer system contained in a vehicle and configured to run an energy plan component, according to one embodiment of the present invention.

Embodiments of the invention generally provide techniques for determining a driver's itinerary and creating an energy recharging plan for the route. Currently, this task must be done manually by the driver. This leads to both inefficiencies and inconvenience to the driver. Embodiments of the invention provide a method of querying the driver to determine a travel itinerary. Embodiments of the invention may then create an energy-charging plan for the driver's planned travel itinerary, based on a driver profile for the driver.

In one embodiment, an energy plan component may interactively determine a travel plan for a driver of a vehicle. Once the plan has been determined, the energy plan component may determine a current range of the vehicle based on available energy and fuel sources. If the current range of the vehicle is less than the distance needed to complete the travel plan, the energy plan component may create an energy replenishment plan that includes one or more recharging waypoints at which the user may recharge the vehicle. The energy replenishment plan includes sufficient waypoints so that, if the user recharges the vehicle at the specified waypoints, the vehicle will have enough energy and/or fuel to complete the travel itinerary. The energy plan component may then monitor the user's position and, if the user changes course, the energy plan component may update the energy replenishment plan to account for the new route.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a block diagram of components of a computer system contained in a vehicle and configured to run an energy plan component, according to one embodiment of the present invention. As shown, the vehicle 100 includes a computer system 110. The computer system 110 includes computer processor(s) 120, storage media 122, one or more I/O devices 124, and system memory 126. Computer processor 120 may be any processor capable of performing the functions described herein. I/O devices 124 may represent a variety of input and output devices, including keyboards, mice, visual displays, printers and so on. Furthermore, as will be understood by one of ordinary skill in the art, any computer system capable of performing the functions described herein may be used.

In the pictured embodiment, memory 126 contains an energy plan component 128 and an operating system 130. Although memory 126 is shown as a single entity, memory 126 may include one or more memory devices having blocks of memory associated with physical addresses, such as random access memory (RAM), read only memory (ROM), flash memory or other types of volatile and/or non-volatile memory. The operating system 130 may be any operating system capable of performing the functions described herein. Thus, for example, memory 126 may comprise RAM 126 containing an instance of a Linux® operating system 130 (Note: Linux is a trademark of Linus Torvalds in the US, other countries, or both).

In one embodiment, the energy plan component 128 may determine a travel plan, with a user in an electric vehicle. The energy plan component 128 may base this determination, in whole or in part, on a profile associated with the user. Once the travel plan has been determined, the energy plan component 128 may determine a maximum travel distance for the vehicle based on any available energy sources. In one embodiment of the invention using a purely electric vehicle, a battery may be the only available energy source. In another embodiment, a hybrid electric vehicle may have both a battery and an amount of fuel available as energy sources. Once the maximum travel distance has been calculated, if the maximum travel distance is less than the distance of the travel plan (i.e., if there is not enough energy and/or fuel to complete the travel plan), the energy plan component 128 may calculate an energy replenishment plan. The energy replenishment plan includes one or more recharging waypoints for the user to recharge the vehicle at in order for the vehicle to have enough energy to complete all the stops in the travel plan.

Figure 2:
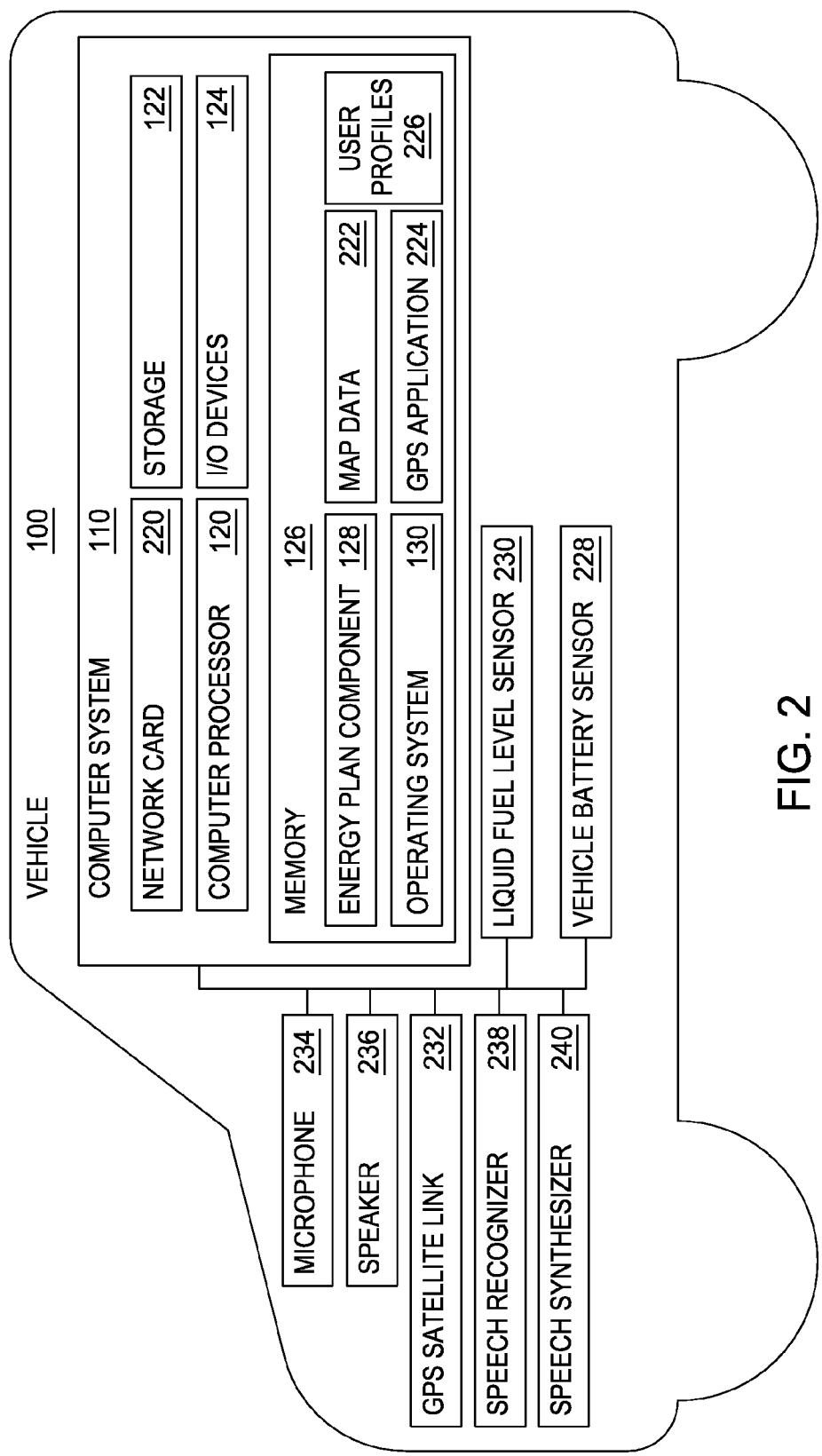
FIG. 2 is a block diagram components of a computer system contained in a vehicle and configured to run an energy plan component, according to one embodiment of the present invention.

FIG. 2 is a block diagram of components of a computer system contained in a vehicle and configured to run an energy plan component, according to one embodiment of the present invention. As shown, the vehicle 100 includes a computer system 110. The computer system 110 contains a network card 220, computer processor(s) 120, storage media 122, I/O devices 124 and memory 126. The memory 126 contains an energy plan component 128, operating system 130, map data 222, a GPS application 224 and user profile(s) 226. The network card 220 may be used, for instance, for updating the energy plan component 128, updating the map data 222, or retrieving traffic information, accident information, construction information, or weather conditions.

The map data 222 may include virtual representations of road maps, as well as metadata describing the virtual maps. Example map data 222 includes data on roads, intersections, speed limits, traffic conditions and construction work. The user profiles 226 may contain information about various drivers of the vehicle 100. For example, a user profile 226 for a particular driver may include historical data that includes previous travel plans for the driver, and/or user preference data such as preferred routes travelled by the driver and recharging preferences for the driver.

The vehicle 100 also contains speaker(s) 236, a microphone 234, a speech recognizer 238 and a speech synthesizer 240. The energy plan component 128 may use these components 234, 236, 238 and 240 to communicate with the user. In one embodiment, the energy plan component 128 may receive a user command through the microphone 234. The energy plan component 128 may then analyze the command using the speech recognizer 238 to determine what the user wishes to do. For example, the user may communicate that he wishes to add a waypoint of "Home." The energy plan component 128 may receive this communication via the microphone 234, and use the speech recognizer 238 to determine that the user wishes to make the user's home a waypoint in the current travel plan. The energy plan component 128 may then formulate a response and use the speech synthesizer 240 to render the response in a form understandable by the user. The energy plan component 128 may communicate this response to the user using the speakers 236. For example, the energy plan component 128 may wish to acknowledge the user's command and tell the user that the waypoint has been added to the travel plan. The energy plan component 128 may generate a response using the speech synthesizer 240 stating "Waypoint home has been added", and communicate this message to the user using the speakers 236.

Additionally, the vehicle 100 contains a GPS satellite link 232. The GPS application 224 may process signals received by the GPS satellite link 230 in order to calculate the current position of the vehicle. The energy plan component 128 may then use the calculated current position, in conjunction with the map data 222, in order to determine a total travel distance for the travel plan. Furthermore, the energy plan component 128 may use the calculated current position of the vehicle to monitor the user's route, and if the user alters his route, the energy plan component 128 may re-calculate the total travel distance based on the user's new course. In addition, upon detecting that the user has altered his route, the energy plan component 128 may update the actual travel plan accordingly. For example, if the energy plan component 128 detects that the user has changed course, the energy plan component 128 may prompt the user (e.g., through the speakers 236 or display 124) as to whether the user wishes to update the actual travel plan. The user may then indicate (e.g., through the microphone 234) that he wants to make an additional stop and thus wishes to add a waypoint to the actual travel plan. The energy plan component 128 may then update the actual travel plan accordingly.

The vehicle 100 also contains a battery sensor 228 and a liquid fuel-level sensor 230. The battery sensor 228 may determine a current charge level of a battery in the electric vehicle 100. Similarly, the liquid fuel-level sensor 230 may determine a current level of liquid fuel in the vehicle. Of course, embodiments of the invention intended for an electric vehicle, or for any vehicle that does not consume liquid fuel, may not include the liquid fuel-level sensor 230.

When a user enters the vehicle 100, the energy plan component 128 may create an initial travel plan based on the user profile 226 for the user. The initial travel plan may include a set of waypoints that the user is likely to travel to, which the energy plan component 128 determines by referencing the user profile 226 to see what destinations the user has previously travelled to based on historical usage of the vehicle for the time of day and day of week. The energy plan component 128 may then communicate the initial travel plan to the user by use of the speakers 236. The energy plan component 128 may also use I/O devices 124, such as a display, to communicate the initial travel plan to the user. After suggesting an initial travel plan to the user, the energy plan component 128 may use the microphone 234 and speakers 236 in the vehicle to interactively determine an actual travel plan with a user. For instance, if a user wishes to delete a waypoint from the suggested initial travel plan, the user may communicate this to the energy plan component 128 via the microphone 234 to an automated speech recognizer 238 or via the display 124 (which may be a touch screen). Likewise, the energy plan component 128 may then confirm the deletion of the waypoint to the user through the vehicle speakers 236 using the speech synthesizer 240.

Figure 3:
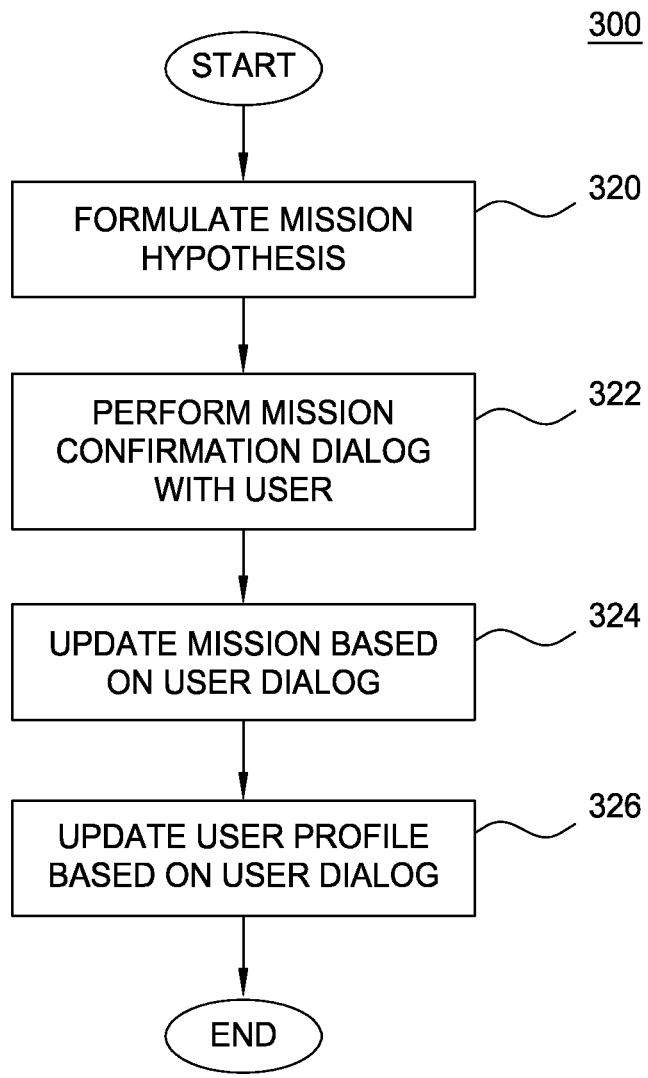
FIG. 3 is a method of determining a travel plan for a driver, according to one embodiment of the present invention.

FIG. 3 is a method of determining an itinerary for a driver, according to one embodiment of the present invention. As shown, the method 300 begins at step 320, where the energy plan component 128 formulates a mission hypothesis and creates an initial travel plan. The energy plan component may create the initial travel plan based on historical data saved in a user profile 226 for the driver. Furthermore, in addition to the waypoints, the initial travel plan may contain an ordering for the waypoints that indicates the order in which the waypoints are travelled to. Additionally, the initial travel plan may contain a time spent at each waypoint. For example, assume that every Friday, Bob leaves work at 5:00 pm, then drives to the gym, stays for an hour, and finally drives home. If Bob enters a vehicle equipped with embodiments of the invention at 5:00 pm on a given Friday, the vehicle may create an initial travel plan (at step 320) that contains the waypoints "gym" and "home." The initial travel plan may include these waypoints in the order of first "gym" and second "home." Furthermore, the initial travel plan may include a duration of 60 minutes for the waypoint "gym."

Once the initial travel plan has been determined, the energy plan component 128 performs a mission confirmation dialog with the user (at step 322). The energy plan component 128 may present the initial travel plan to the user by telematically communicating the plan to the user. For instance, the energy plan component 128 may, through the speakers 236, prompt the user with the question "Are you planning to travel to the gym and then return home?" In another embodiment, the energy plan component 128 may present the initial travel plan to the user by use of a display device 124. If the user indicates that the travel plan is incorrect, the energy plan component 128 may update the travel plan based on a dialog with the user (at step 324). For example, in response to the above question, the user may reply "No." A dialog, as shown in Table 1, may then occur. Once the user has communicated all of his travel plans, the energy plan component 128 may update the travel plan based on this dialog and the user's responses. Once the travel plan has been created, the energy plan component 128 may update the user profile 226 for the user to reflect the user's current travel plans, as well as any preferences specified by the user.

TABLE 1

Exemplary Travel Plan Dialog

| | |
|---|---|
| Energy Plan Component: | Are you planning additional stops or do you have different plans today? |
| User: | I have different plans today. |
| Energy Plan Component: | What is your first destination? |
| User: | South Beach. |
| Energy Plan Component: | What is the next destination? |
| User: | Miami airport. |
| Energy Plan Component: | What is the next destination? |
| User: | Home. |
| Energy Plan Component: | So you are going to South Beach, then the Miami Airport, then returning home? |
| User: | Yes |

Figure 4:
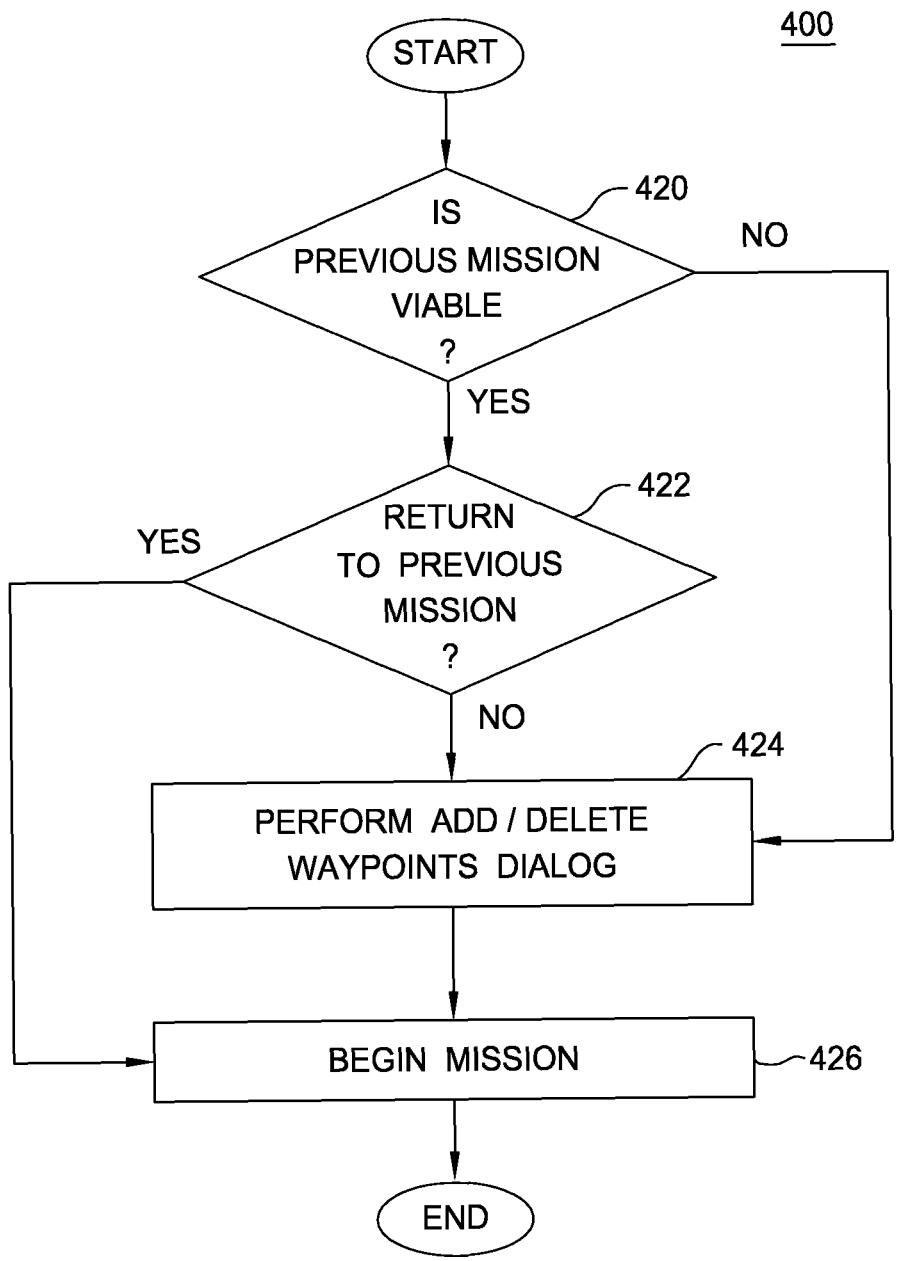
FIG. 4 is a method of determining a travel plan for a driver, according to one embodiment of the present invention.

FIG. 4 is a method of determining an itinerary for a driver and building an energy replenishment plan to complete the itinerary, according to one embodiment of the present invention. As shown, the method 400 begins at step 420, where the energy plan component 128 determines whether a previous travel plan is viable. The previous travel plan may not be viable if, for instance, insufficient energy resources are available to complete the plan. Alternatively, because travel plans contain not only waypoints but also time spent at each waypoint, a plan may no longer be viable if a user spends too much time at a single destination. For example, assume a user is going to pick someone up at the airport and is then stopping at a restaurant. In such a scenario, a travel plan may include the waypoints "airport" and "restaurant," and further include a duration of 60 minutes for the waypoint "airport." If the user arrives at the airport and then, due to external circumstances (e.g., the flight was delayed), stays at the airport for 7 hours, the energy plan component 128 may determine that the previous plan is no longer valid, since the actual time spent at the "airport" waypoint greatly exceeded the planned duration. If the energy plan component 128 determines the previous mission is not viable, the component then initiates a dialog with the user to determine the user's current travel plan (at step 424). As discussed above, an exemplary dialog may be found in Table 1.

If the previous mission is viable, the energy plan component 128 prompts the user to determine whether the user wishes to continue with the previous travel plan, or if the user wishes to create a new travel plan (at step 422). For instance, assume the travel plan includes the waypoints "gym" and "home," and the user has driven to the gym and exited the vehicle. When the user again enters the vehicle, the energy plan component 128 may prompt the user as to whether the user wishes to continue the previous travel plan and travel home. If the user indicates that he does not wish to return to the previous mission, the energy plan component 128 initiates a dialog with the user to determine the user's current travel plan (at step 424). Once the current travel plan is determined (at step 424), or if the user indicates that he wishes to return to the previous mission (at step 422), the energy plan component 128 begins monitoring the user's progress towards the travel plan (at step 426) and the method ends.

Figure 5:
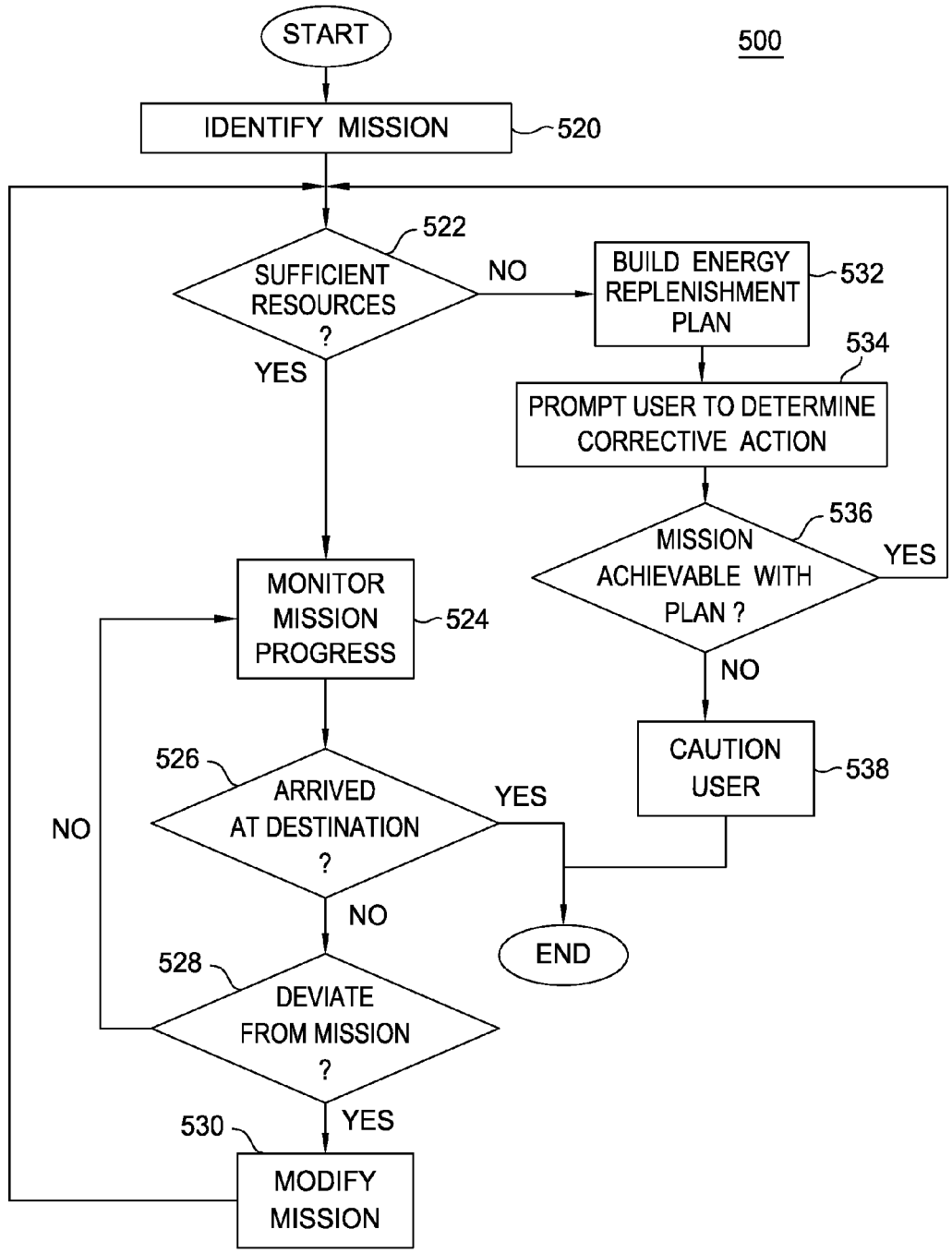
FIG. 5 is a method of determining an energy replenishment plan to complete a travel plan, according to one embodiment of the present invention.

FIG. 5 is a method of determining an energy replenishment plan to complete a travel plan, according to one embodiment of the present invention. As shown, the method 500 begins at step 520, where the energy plan component 128 determines a current travel plan. In one embodiment, the energy plan component 128 uses method 300 to identify the current travel plan. In another embodiment, the energy plan component 128 uses method 400 to identify the current travel plan. Once the travel plan is identified, the energy plan component 128 determines whether the vehicle has sufficient energy resources to complete the travel plan (at step 522). The energy plan component 128 may calculate a total travel distance to visit all the waypoints in the travel plan in the specified order. In one embodiment, the component 128 makes this determination using the map data 222 and the GPS application 224. The energy plan component 128 may also determine a total travel distance from battery power using the vehicle battery sensor 228. In some embodiments, the energy plan component 128 may further determine a total travel distance from liquid fuel sources (e.g., petroleum) using the liquid fuel-level sensor 230. The energy plan component 128 may then compare the total travel distance to visit all the waypoints with the total travel distance from battery power (and in some embodiments, with the total travel distance from liquid fuel sources as well), to determine if the vehicle has sufficient energy resources to complete the current travel plan.

If the total travel distance from available energy sources exceeds the total travel distance to visit all the waypoints in the travel plan, then the energy plan component 128 may conclude that the vehicle has sufficient resources, and enters a loop (steps 524, 526, 528) to monitor the user's travel progress (at step 524). The energy plan component 128 may continue monitoring and determine whether the user has arrived at a waypoint in the current travel plan (at step 526). If the user has arrived at the waypoint, the method 500 ends. However, if the user has not yet arrived at the waypoint, the energy plan component 128 determines whether the user has deviated from the travel plan (at step 528). If the user has not deviated from the travel plan, the energy plan component 128 continues the loop and returns to step 524, where it monitors the user's progress. If the energy plan component 128 determines that the user has deviated from the travel plan (at step 528), the energy plan component prompts the user to modify the mission (at step 530). This may include adding waypoints to or removing waypoints from the mission. In another embodiment, the user may indicate he does not wish to change the travel plan. The energy plan component 128 may then recalculate the travel distance of the mission based on the user's new position. Once the mission has been modified, the method begins again, with the energy plan component 128 determining whether the vehicle has sufficient resources to complete the mission (at step 522).

At step 522, if the energy plan component 128 determines that the vehicle does not have sufficient resources to complete the travel plan, the component 128 may construct an energy replenishment plan (at step 532). The energy replenishment plan may include one or more waypoints at which the user may stop and recharge the vehicle in order to have enough energy to complete the travel plan. Furthermore, the energy replenishment plan may include a charging duration associated with each of the waypoints in the plan. For example, the energy plan component 128 may determine that a user only needs to recharge his vehicle for 30 minutes at a particular location in order to complete the travel plan, and then the vehicle can be fully charged at the final destination of the travel plan (e.g., the user's home).

Furthermore, the energy replenishment plan may include certain waypoints based on a user profile 226 for the user. In one embodiment, the energy plan component 128 may select fueling waypoints that the user has visited previously for the energy replenishment plan, based on the user profile 226 for the user. In another embodiment, the user may indicate preferred fueling waypoints in the user profile 226 for the user. The energy plan component 128 may then construct the energy replenishment plan while giving preference to the user's preferred fueling waypoints specified in the user profile 226. In an alternate embodiment, the user may indicate, in the user profile 226, certain fueling waypoints that should never be included in the energy replenishment plan, and the component 128 constructs the plan omitting these waypoints. In yet another embodiment, the energy plan component 128 may determine a number of different options for potential refueling waypoints, and then prompt the user (e.g., by using the microphone 234 and speakers 236 and/or display 124) to select refueling waypoints from the list of available waypoints.

Once the energy replenishment plan is constructed (at step 532), the energy plan component prompts the user to determine if any corrective action is required for the energy replenishment plan (at step 534). For example, at step 532, the energy plan component 128 may construct an energy replenishment plan containing Recharging Station A, based on the user's past preference for Recharging Station A. However, when prompted (at step 534), the user may indicate that he wishes to alter the energy replenishment plan, because he wants to try the newly-opened Recharging Station B. Once the user has made any required changes to the energy replenishment plan, the energy plan component 128 determines whether the current travel plan is achievable using the updated energy replenishment plan (at step 536). For instance, using the above example, if the energy plan component 128 determines that the current travel plan is achievable by recharging the vehicle for 90 minutes at Recharging Station B (as in the energy replenishment plan), the energy plan component 128 may modify the current travel plan to include Recharging Station B and may update the order of the waypoints in the travel plan accordingly. Once the current travel plan has been modified, the method then begins again at step 522. An exemplary energy replenishment plan dialog is shown in Table 2.

TABLE 2

Exemplary Energy Replenishment Plan Dialog

| | |
|---|---|
| Energy Plan Component: | So you are going to South Beach, then the Miami Airport, then returning home? |
| User: | Yes. |
| Energy Plan Component: | Vehicle electrical power will not be sufficient for the total travel distance of 118 miles. There are no grid connection services at your destinations. I can suggest additional destinations along the way that offer grid connection services. Would you like to hear these alternatives? |
| User: | Yes. |
| Energy Plan Component: | There is a Jolt and Volt coffee bar near South Beach that offers level 3 charging service. Thirty minutes of connection time there will provide enough additional power for you to complete your travel plans. Would you |

TABLE 2-continued

Exemplary Energy Replenishment Plan Dialog

| | like to stop at the Jolt and Volt, or hear additional alternatives? |
|---|---|
| User: | Stop at the Jolt and Volt. |
| Energy Plan Component: | Navigation routing has been updated to include a waypoint at the Jolt and Volt. Drive Safely. |

However, if the current travel plans are not achievable, even with the updated energy replenishment plan, then the energy plan component 128 prompts the user and cautions him to modify his current travel plans (at step 538). For example, assume the user has indicated a travel plan of driving from "home," to the "airport" and then "home" again. The energy plan component 128 may determine (at step 532) that no recharging stations are present between the waypoints of "home" and "airport." If the component 128 then determines that the distance to complete the travel plan exceeds the maximum distance based on the energy level of the battery, then the component 128 may determine that the mission is not achievable, even after calculating (in this case, an empty) energy replenishment plan (at step 536). Thus, in this example, the energy plan component 128 may warn the user that his current travel plan is unachievable. In another embodiment, the energy plan component 128 may advise the user that a range extender module may be used in order to complete the travel plans. The energy plan component 128 may also communicate to the user nearby locations at which a range extender module may be obtained. Once the user is warned, the method ends.

In one embodiment, the energy plan component 128 may account for real-time information when creating the energy replenishment plan. Examples of such real-time information include weather information, traffic conditions, accident information, road conditions, construction information, and pricing differences between different recharging stations. For example, the energy plan component 128 may determine that there are two viable recharging stations for a given energy replenishment plan, Recharging Station A and Recharging Station B. However, the energy plan component 128 may determine that Recharging Station A charges 20% less than Recharging Station B. In this case, the energy plan component 128 may create an energy replenishment plan using Recharging Station A, based on the pricing differences between the two recharging stations. In one embodiment, the user may designate a weight value in the user profile for use in determining which recharging station to use in the energy replenishment plan when the recharging stations have different prices. For example, the user may designate a general preference for Recharging Station B, but may indicate that other recharging stations may be selected if they are at least 10% less expensive. In this case, the energy plan component 128 may create an energy replenishment plan using Recharging Station A from the above example, because Recharging Station A is 20% less expensive than Recharging Station B, even though the user has indicated a general preference for Recharging Station B.

Figure 6:
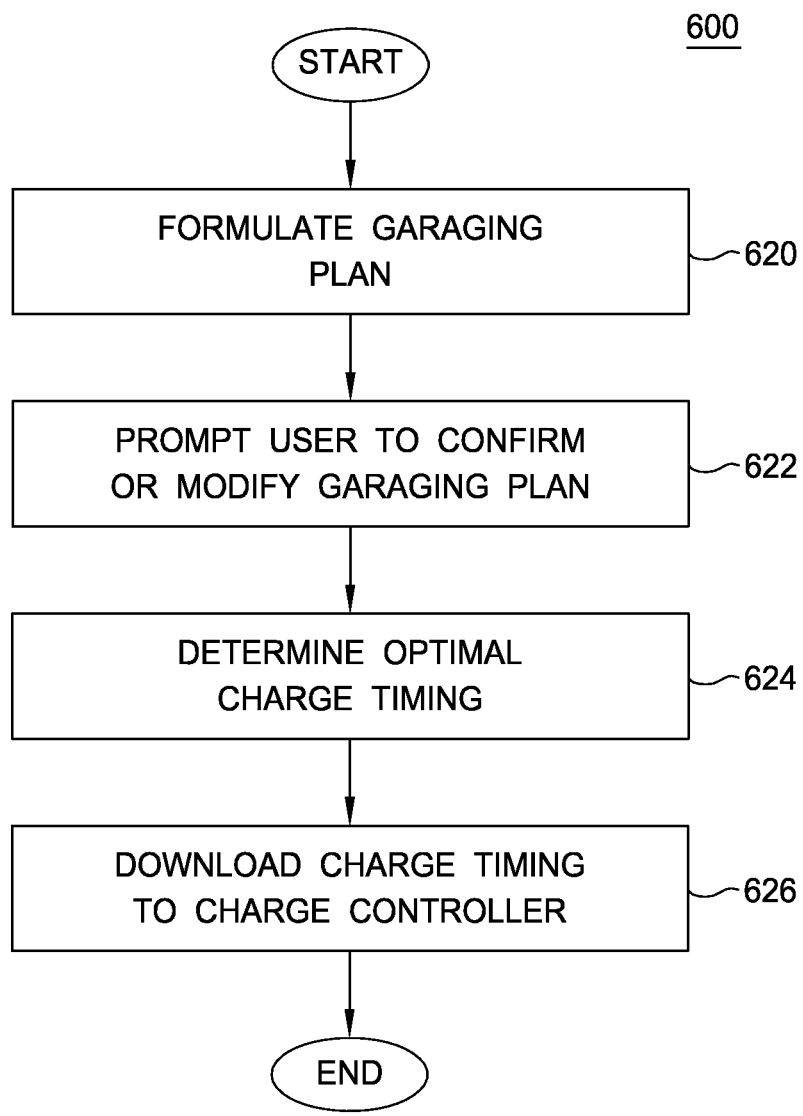
FIG. 6 is a method of determining a charging schedule to optimize recharging of an electric vehicle, according to one embodiment of the present invention.

FIG. 6 is a method of determining a charging schedule to optimize recharging, according to one embodiment of the present invention. As shown, the method 600 begins at step 620, where the energy plan component 128 creates an initial garaging plan. A garaging plan includes information about how long the user plans to leave the car parked. In one embodiment, the garaging plan includes information on when the user next plans to use the vehicle, as well as the next travel plan for the user. For example, an exemplary garaging plan may indicate the user is remaining home for 3 hours, going to a restaurant at 9:00 pm, staying at the restaurant for an hour, then returning home and remaining until going to work the next morning at 8:00 am. The energy plan component 128 may create the garaging plan based on the user profile 226 for the user. That is, if the user repeatedly follows the same garaging routine on a particular night of the week, when the user again parks the car on that particular night of the week, the energy plan component 128 may create an initial garaging plan based on the user's previous garaging routine.

Once the garaging plan has been created, the energy plan component 128 may confirm the initial garaging plan with the user (at step 622). The energy plan component 128 may then communicate the initial garaging plan to the user (e.g., using the speech synthesizer 240 and the speakers 236). The energy plan component 128 may also use I/O devices 124, such as a display, to communicate the initial garaging plan to the user. After suggesting the initial garaging plan to the user, the energy plan component 128 may interactively determine an actual garaging plan with a user (e.g., using the microphone 234 and speakers 236). For instance, if a user wishes to delete a waypoint from the suggested garaging plan, the user may communicate this to the energy plan component 128 via the microphone 234. Likewise, the energy plan component 128 may then confirm the deletion of the waypoint to the user through the vehicle speakers 236.

Once the garaging plan is completed, the energy plan component 128 may determine an optimal vehicle charging schedule based on the garaging plan (at step 624). The optimal charging schedule is a plan to charge the vehicle at least enough to perform the next travel plan for the user. Furthermore, the energy plan component 128 may also take into account external factors, such as off-peak power hours, when determining the optimal charging schedule. For example, power consumption may be cheaper during the off-peak hours of 1:00 am and 5:00 am. In this case, the energy plan component 128 may create an optimal charging schedule that defers charging the battery until 1:00 am. In some scenarios, the energy plan component 128 may create an optimal charging schedule that partially charges the battery in order to accommodate a future travel plan, but defers fully charging the battery until off-peak hours. For example, a user may arrive home at 6:00 pm and indicate that he is going to remain at home for 3 hours, go out to a restaurant at 9:00 pm, stay for an hour, then return home and remaining until going to work the next morning at 8:00 am. In this case, the energy plan component 128 may create an optimal charging schedule that charges the battery only enough for the user to drive to the restaurant at 9:00 pm and then drive home. The optimal charging schedule may then defer fully charging the battery until after 1:00 am, in order to take advantage of the off-peak hours. Table 3 shows an exemplary dialog for creating the garaging plan.

TABLE 3

Exemplary Dialog

| Energy Plan Component: | You are nearing home. Do you plan to use the vehicle further before tomorrow morning? |
|---|---|
| User: | Yes. |
| Energy Plan Component: | How far do you plan to travel this evening? |
| User: | 20 miles. |
| Energy Plan Component: | How long will you be home before leaving again? |
| User: | Two hours. |

TABLE 3-continued

Exemplary Dialog

| Energy Plan Component: | Please connect the vehicle to the charging station when you get home. Charging will begin immediately. Your vehicle will require 75 minutes of charging time to accommodate your plans this evening. |
|---|---|

Once the energy plan component 128 creates the optimal charging schedule, the energy plan component 128 sends the optimal charging schedule to a charge controller (at step 626). The charge controller then recharges the vehicle's battery according to the optimal charging schedule. Once the optimal charging schedule has been downloaded by the charge controller, the method ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of managing energy capacity in a vehicle, comprising:
generating, interactively with the user and by operation of one or more computer processors, a current travel plan that includes a plurality of waypoints, based on historical data relating to previous routes made by the user to one or more historical waypoints, comprising:
determining a plurality of predicted waypoints, based on the one or more historical waypoints visited by the user during the previous routes;
generating a predicted route for the current travel plan that includes the determined plurality of predicted waypoints; and
revising the predicted route based on user feedback to generate the current travel plan;
determining, an estimated amount of time the user intends to spend at each of the plurality of waypoints in the travel plan, based on a historical amount of time previously spent at the one or more historical waypoints;
determining a maximum distance the vehicle can travel based on a current energy level of the vehicle; and
upon determining that a total travel distance for the current travel plan exceeds the determined maximum distance:
creating an energy replenishment plan including one or more refueling waypoints, based on the current travel plan and a user profile that includes one or more preferences of the user for particular refueling waypoints;
calculating a charging schedule for the vehicle based on the estimated amount of time at each waypoint and a listing of off-peak charging hours, wherein the calculated charging schedule specifies that the vehicle is charged for an amount of time at a first one of the plurality of waypoints based on the estimated amount of time at the first waypoint, and wherein the calculated charging schedule specifies that the vehicle is charged during peak charging hours only as necessary to reach a level of charge that is sufficient to complete the current travel plan and that otherwise the vehicle is otherwise charged during off-peak charging hours; and
charging the vehicle at the first one of the plurality of waypoints in accordance with the charging schedule.

2. The method of claim 1, further comprising:
upon determining that inadequate refueling waypoints are available:
notifying the user that inadequate refueling waypoints are available for the current travel plan;
prompting the user to modify the current travel plan to include adequate refueling waypoints; and
in response to receiving a confirmation from the user, updating the current travel plan to include the adequate refueling waypoints.

3. The method of claim 1, wherein the energy replenishment plan is further based on at least one of the following: i) the calculated travel distance of the current travel plan, ii) an amount of time spent at each waypoint, and iii) the maximum distance the vehicle can travel.

4. The method of claim 1, wherein generating a current travel plan further comprises:
upon receiving a response from the user that confirms the initial travel plan, adopting the initial travel plan as the current travel plan.

5. The method of claim 1, wherein the plurality of waypoints includes two or more waypoints and a final waypoint, and wherein calculating a charging schedule for the vehicle further comprises:
for each of the two or more waypoints in the current travel plan:
determining whether the vehicle has sufficient power to reach a next waypoint in the current travel plan;
upon determining that the vehicle does not have sufficient power, and further upon determining that the waypoint includes charging capabilities:
determining whether the vehicle can be charged for a first amount of time during off-peak charging hours at the waypoint, sufficient to reach the next waypoint in the current travel plan;
if so, determining that the vehicle should only be charged at the waypoint during off-peak charging hours; and
if not, determining that the vehicle should be charged at the waypoint at least in part during peak charging hours.

6. The method of claim 1, wherein generating the current travel plan further comprises:
generating an initial travel plan that specifies a predicted intended usage of the vehicle derived from the historical data and that includes at least one of the one or more historical waypoints;
presenting the initial travel plan to the user; and upon receiving an indication from the user to alter the initial travel plan, modifying the initial travel plan based on one or more interactions with the user, to generate and present the current travel plan to the user, wherein the one or more interactions with the user include one or more responses corresponding to one or more prompts.

7. The method of claim 1, wherein the energy replenishment plan is further based on a difference in energy cost between refueling waypoints in a plurality of refueling waypoints, relative to the one or more preferences of the user for particular refueling waypoints.

8. The method of claim 1, further comprising:
monitoring a current position of the vehicle;
upon determining that the vehicle has deviated from the current travel plan, updating the current travel plan based on the current position of the vehicle; and
re-creating the energy replenishment plan based on the updated current travel plan.

9. The method of claim 8, wherein monitoring the position of the vehicle further comprises:
receiving a plurality of signals from a plurality of Global Positioning System (GPS) satellites; and
calculating the position of the vehicle based on the plurality of signals.

10. The method of claim 1, wherein the vehicle is a hybrid electric vehicle, and wherein determining a maximum distance the vehicle can travel further comprises:
determining a fuel distance the vehicle can travel based on a current fuel level of the vehicle;
determining an energy distance the vehicle can travel based on a current battery level of the vehicle; and
determining the maximum distance the vehicle can travel based on the fuel distance and the energy distance.

11. The method of claim 10, wherein the vehicle is an electric vehicle with a range extender module.

12. A non-transitory computer-readable medium containing a program which, when executed, performs an operation, comprising:
generating, interactively with the user, a current travel plan that includes a plurality of waypoints, based on historical data relating to previous routes made by the user to one or more historical waypoints, comprising:
determining a plurality of predicted waypoints, based on the one or more historical waypoints visited by the user during the previous routes;
generating a predicted route for the current travel plan that includes the determined plurality of predicted waypoints; and
revising the predicted route based on user feedback to generate the current travel plan;
determining, an estimated amount of time the user intends to spend at each of the plurality of waypoints in the travel plan, based on a historical amount of time previously spent at the one or more historical waypoints;
determining a maximum distance the vehicle can travel based on a current energy level of the vehicle; and
upon determining that a total travel distance for the current travel plan exceeds the determined maximum distance:
creating an energy replenishment plan including one or more refueling waypoints, based on the current travel plan and a user profile that includes one or more preferences of the user for particular refueling waypoints;
calculating a charging schedule for the vehicle based on the estimated amount of time at each waypoint and a listing of off-peak charging hours, wherein the calculated charging schedule specifies that the vehicle is charged for an amount of time at a first one of the plurality of waypoints based on the estimated amount of time for the first waypoint, and wherein the calculated charging schedule specifies that the vehicle is charged during peak charging hours only as necessary to reach a level of charge that is sufficient to complete the current travel plan and that otherwise the vehicle is otherwise charged during off-peak charging hours; and
charging the vehicle at the first one of the plurality of waypoints in accordance with carrying out the charging schedule.

13. The non-transitory computer-readable medium of claim 12, the operation further comprising:
monitoring a current position of the vehicle;
upon determining that the vehicle has deviated from the current travel plan, updating the current travel plan based on the current position of the vehicle; and
re-creating the energy replenishment plan based on the updated current travel plan.

14. The non-transitory computer-readable medium of claim 12, wherein monitoring the position of the vehicle further comprises:
receiving a plurality of signals from a plurality of Global Positioning System (GPS) satellites; and
calculating the position of the vehicle based on the plurality of signals.

15. The non-transitory computer-readable medium of claim 12, the operation further comprising:
upon determining that inadequate refueling waypoints are available:
notifying the user that inadequate refueling waypoints are available for the current travel plan;
prompting the user to modify the current travel plan to include adequate refueling waypoints; and
in response to receiving a confirmation from the user, updating the current travel plan to include the adequate refueling waypoints.

16. The non-transitory computer-readable medium of claim 12, wherein the vehicle is a hybrid electric vehicle, and wherein determining a maximum distance the vehicle can travel further comprises:
determining a fuel distance the vehicle can travel based on a current fuel level of the vehicle;
determining an energy distance the vehicle can travel based on a current battery level of the vehicle; and
determining the maximum distance the vehicle can travel based on the fuel distance and the energy distance.

17. The non-transitory computer-readable medium of claim 12, wherein the vehicle is an electric vehicle with a range extender module.

18. The non-transitory computer-readable medium of claim 12, wherein the energy replenishment plan is further based on at least one of the following: i) the calculated travel distance of the current travel plan, ii) an amount of time spent at each waypoint, and iii) the maximum distance the vehicle can travel.

19. The non-transitory computer-readable medium of claim 12, wherein generating a current travel plan further comprises:
upon receiving a response from the user that confirms the initial travel plan, adopting the initial travel plan as the current travel plan.

20. A system, comprising:
a computer processor; and
a memory containing a program that, when executed on the computer processor, performs a operation for managing energy capacity in a vehicle, comprising:
    generating, interactively with the user, a current travel plan that includes a plurality of waypoints, based on historical data relating to previous routes made by the user to one or more historical waypoints, comprising:
        determining a plurality of predicted waypoints, based on the one or more historical waypoints visited by the user during the previous routes;
        generating a predicted route for the current travel plan that includes the determined plurality of predicted waypoints; and
        revising the predicted route based on user feedback to generate the current travel plan;
    determining, an estimated amount of time to be the user intends to spend at each of the plurality of waypoints in the travel plan, based on a historical amount of time previously spent at the one or more historical waypoints;
    determining a maximum distance the vehicle can travel based on a current energy level of the vehicle; and
    upon determining that a total travel distance for the current travel plan exceeds the determined maximum distance:
        creating an energy replenishment plan including one or more refueling waypoints, based on the current travel plan and a user profile that includes one or more preferences of the user for particular refueling waypoints;
    calculating a charging schedule for the vehicle based on the estimated amount of time at each waypoint and a listing of off-peak charging hours, wherein the calculated charging schedule specifies that the vehicle is charged for an amount of time at a first one of the plurality of waypoints based on the estimated amount of time for the first waypoint, and wherein the calculated charging schedule specifies that the vehicle is charged during peak charging hours only as necessary to reach a level of charge that is sufficient to complete the current travel plan and that otherwise the vehicle is otherwise charged during off-peak charging; and
    charging the vehicle at the first one of the plurality of waypoints in accordance with carrying out the charging schedule.

21. The system of claim 20, wherein the program, when executed, further performs the steps of:
    determining a fuel distance the vehicle can travel based on a current fuel level of the vehicle;
    determining an energy distance the vehicle can travel based on a current battery level of the vehicle; and
    determining the maximum distance the vehicle can travel based on the fuel distance and the energy distance.

* * * * *